United States Patent
McCoy et al.

(10) Patent No.: US 8,180,824 B2
(45) Date of Patent: May 15, 2012

(54) LOG COLLECTION DATA HARVESTER FOR USE IN A BUILDING AUTOMATION SYSTEM

(75) Inventors: Sean M. McCoy, Maple Grove, MN (US); Shane M. Gydesen, Stillwater, MN (US); Christopher M. Markus, Andover, MN (US)

(73) Assignee: Trane International, Inc., Piscataway, NJ (US)

( * ) Notice: Subject to any disclaimer, the term of this patent is extended or adjusted under 35 U.S.C. 154(b) by 362 days.

(21) Appl. No.: 12/390,964

(22) Filed: Feb. 23, 2009

(65) Prior Publication Data
US 2010/0228805 A1    Sep. 9, 2010

(51) Int. Cl.
*G06F 15/16* (2006.01)
(52) U.S. Cl. .................................. 709/201; 709/223
(58) Field of Classification Search ............... 709/201, 709/223
See application file for complete search history.

(56) References Cited

U.S. PATENT DOCUMENTS

| | | | |
|---|---|---|---|
| 5,311,451 A | 5/1994 | Barrett | |
| 5,321,603 A | 6/1994 | Schwenke | |
| 5,384,697 A | 1/1995 | Pascucci | |
| 5,444,851 A | 8/1995 | Woest | |
| 5,463,735 A | 10/1995 | Pascucci et al. | |
| 5,511,188 A | 4/1996 | Pascucci et al. | |
| 5,522,044 A | 5/1996 | Pascucci et al. | |
| 5,550,980 A | 8/1996 | Pascucci et al. | |
| 5,559,955 A | 9/1996 | Dev et al. | |
| 5,598,566 A | 1/1997 | Pascucci et al. | |
| 5,761,432 A | 6/1998 | Bergholm | |
| 5,805,442 A | 9/1998 | Crater et al. | |
| 5,809,235 A * | 9/1998 | Sharma et al. ............. 709/230 |
| 5,884,072 A | 3/1999 | Rasmussen | |
| 5,982,362 A | 11/1999 | Crater et al. | |
| 5,995,498 A | 11/1999 | Toot, Jr. et al. | |
| 6,115,713 A | 9/2000 | Pascucci et al. | |
| 6,119,125 A | 9/2000 | Gloudeman et al. | |
| 6,141,595 A | 10/2000 | Gloudeman et al. | |
| 6,145,751 A | 11/2000 | Ahmed | |
| 6,148,355 A | 11/2000 | Mahalingam | |
| 6,154,681 A | 11/2000 | Drees et al. | |
| 6,157,943 A | 12/2000 | Meyer | |

(Continued)

OTHER PUBLICATIONS

Daintree Networks, "What's so good about mesh networks?," 2007, 8 pages.

(Continued)

*Primary Examiner* — Douglas Blair
(74) *Attorney, Agent, or Firm* — Patterson Thuente Christensen Pedersen, LLP

(57) ABSTRACT

A building automation system (BAS) comprising a plurality of end devices, at least one communication network, and a server engine comprising a data harvester. The end devices are each associated with at least one of a space, a system, or a subsystem for at least a portion of a building or a campus. The communication network communicatively couples to at least a portion of the plurality of end devices to the server engine. In one embodiment, the server engine is adapted to dynamically implement the data harvesting capability to periodically establish communications with, to receive and store data about, end devices and to selectively control the utilization of the communication network in order to prevent overrun or data loss. Methods of handling log collection from end devices in a building automation system (BAS) based upon a distributed schedule provided by a user or a priority scheme are also disclosed.

6 Claims, 6 Drawing Sheets

U.S. PATENT DOCUMENTS

| | | | |
|---|---|---|---|
| 6,167,316 A | 12/2000 | Gloudeman et al. | |
| 6,240,326 B1 | 5/2001 | Gloudeman et al. | |
| 6,241,156 B1 | 6/2001 | Kline et al. | |
| 6,263,387 B1 | 7/2001 | Chrabaszcz | |
| 6,266,726 B1 | 7/2001 | Nixon et al. | |
| 6,334,107 B1 | 12/2001 | Gale et al. | |
| 6,353,853 B1 | 3/2002 | Gravlin | |
| 6,389,331 B1 | 5/2002 | Jensen et al. | |
| 6,405,103 B1 | 6/2002 | Ryan et al. | |
| 6,487,457 B1 | 11/2002 | Hull et al. | |
| 6,496,893 B1 | 12/2002 | Arai | |
| 6,580,950 B1 | 6/2003 | Johnson et al. | |
| 6,584,095 B1 | 6/2003 | Jacobi et al. | |
| 6,584,096 B1 | 6/2003 | Allan | |
| 6,598,056 B1 | 7/2003 | Hull et al. | |
| 6,636,893 B1 | 10/2003 | Fong | |
| 6,708,505 B2 | 3/2004 | Nakamura et al. | |
| 6,714,977 B1 | 3/2004 | Fowler et al. | |
| 6,832,120 B1 | 12/2004 | Frank et al. | |
| 6,834,298 B1 | 12/2004 | Singer | |
| 6,925,571 B1 | 8/2005 | Motoyama | |
| 6,990,115 B2* | 1/2006 | Assa et al. | 370/417 |
| 6,999,824 B2 | 2/2006 | Glanzer et al. | |
| 7,010,796 B1 | 3/2006 | Strom et al. | |
| 7,065,769 B1 | 6/2006 | Tolopka | |
| 7,080,142 B2 | 7/2006 | Galloway et al. | |
| 7,136,914 B2 | 11/2006 | Motoyama | |
| 7,165,109 B2 | 1/2007 | Chiloyan et al. | |
| 7,177,925 B2* | 2/2007 | Carcido et al. | 709/223 |
| 7,194,537 B2 | 3/2007 | Motoyama | |
| 7,206,791 B2 | 4/2007 | Hind et al. | |
| 7,240,106 B2 | 7/2007 | Cochran et al. | |
| 7,246,162 B2 | 7/2007 | Tindal | |
| 7,249,170 B2 | 7/2007 | Tindal et al. | |
| 7,250,856 B2 | 7/2007 | Havekost et al. | |
| 7,251,534 B2 | 7/2007 | Walls et al. | |
| 7,275,079 B2 | 9/2007 | Brodsky et al. | |
| 7,287,085 B1 | 10/2007 | Motoyama | |
| 7,287,257 B2 | 10/2007 | Meza | |
| 7,289,995 B2 | 10/2007 | Motoyama et al. | |
| 7,293,253 B1 | 11/2007 | Soukup | |
| 7,296,079 B2 | 11/2007 | Motoyama | |
| 7,302,469 B2 | 11/2007 | Motoyama | |
| 7,308,449 B2* | 12/2007 | Fairweather | 1/1 |
| 7,320,023 B2 | 1/2008 | Chintalapati | |
| 7,337,242 B1 | 2/2008 | Motoyama | |
| 7,349,761 B1 | 3/2008 | Cruse | |
| 7,356,346 B2 | 4/2008 | Gopalakrishnan et al. | |
| 7,392,310 B2 | 6/2008 | Motoyama | |
| 7,421,474 B2 | 9/2008 | Motoyama | |
| 7,433,740 B2 | 10/2008 | Hesse et al. | |
| 7,437,452 B2 | 10/2008 | Motoyama | |
| 7,437,596 B2 | 10/2008 | McFarland | |
| 7,447,766 B2 | 11/2008 | Motoyama | |
| 7,480,672 B2* | 1/2009 | Hahn et al. | 1/1 |
| 7,500,003 B2 | 3/2009 | Motoyama | |
| 7,502,848 B2 | 3/2009 | Motoyama | |
| 7,506,048 B1 | 3/2009 | Motoyama | |
| 7,512,450 B2 | 3/2009 | Ahmed | |
| 7,519,698 B2 | 4/2009 | Motoyama | |
| 7,533,167 B2 | 5/2009 | Motoyama | |
| 7,533,333 B2 | 5/2009 | Motoyama | |
| 7,536,450 B2 | 5/2009 | Motoyama | |
| 7,574,503 B2 | 8/2009 | Motoyama | |
| 7,606,894 B2 | 10/2009 | Motoyama | |
| 7,610,372 B2 | 10/2009 | Motoyama | |
| 7,610,374 B2 | 10/2009 | Motoyama | |
| 7,616,570 B2* | 11/2009 | Ronneke et al. | 370/235 |
| 7,634,555 B1 | 12/2009 | Wainscott, Jr. et al. | |
| 7,647,397 B2 | 1/2010 | Motoyama | |
| 7,765,289 B2 | 7/2010 | Park | |
| 7,765,826 B2 | 8/2010 | Nichols | |
| 7,870,090 B2 | 1/2011 | McCoy et al. | |
| 7,904,186 B2 | 3/2011 | Mairs et al. | |
| 7,912,951 B2* | 3/2011 | Gulati et al. | 709/224 |
| 7,917,232 B2 | 3/2011 | McCoy et al. | |
| 2002/0016639 A1 | 2/2002 | Smith et al. | |
| 2002/0029096 A1 | 3/2002 | Takai et al. | |
| 2002/0042845 A1 | 4/2002 | Burmann et al. | |
| 2002/0136203 A1 | 9/2002 | Liva | |
| 2002/0152028 A1 | 10/2002 | Motoyama | |
| 2002/0152292 A1 | 10/2002 | Motoyama | |
| 2003/0084176 A1 | 5/2003 | Tewari et al. | |
| 2003/0135765 A1 | 7/2003 | Hind et al. | |
| 2003/0158975 A1 | 8/2003 | Frank et al. | |
| 2003/0159129 A1 | 8/2003 | Frank et al. | |
| 2003/0167323 A1 | 9/2003 | Motoyama | |
| 2004/0059808 A1 | 3/2004 | Galloway et al. | |
| 2004/0075549 A1 | 4/2004 | Haller | |
| 2004/0143510 A1 | 7/2004 | Haeberle et al. | |
| 2004/0148288 A1 | 7/2004 | Haeberle et al. | |
| 2004/0215694 A1 | 10/2004 | Podolsky | |
| 2004/0215740 A1 | 10/2004 | Frank et al. | |
| 2004/0230323 A1 | 11/2004 | Glanzer et al. | |
| 2004/0243988 A1 | 12/2004 | Ota | |
| 2004/0248583 A1 | 12/2004 | Satt et al. | |
| 2004/0249913 A1 | 12/2004 | Kaufman | |
| 2004/0254915 A1 | 12/2004 | Motoyama | |
| 2004/0255023 A1 | 12/2004 | Motoyama | |
| 2005/0071483 A1 | 3/2005 | Motoyama | |
| 2005/0090915 A1 | 4/2005 | Geiwitz | |
| 2005/0177642 A1 | 8/2005 | Motoyama | |
| 2005/0262136 A1 | 11/2005 | Lloyd et al. | |
| 2006/0010232 A1 | 1/2006 | Page et al. | |
| 2006/0047787 A1 | 3/2006 | Agarwal et al. | |
| 2006/0058923 A1 | 3/2006 | Kruk et al. | |
| 2006/0130107 A1 | 6/2006 | Gonder et al. | |
| 2006/0155824 A1 | 7/2006 | Motoyama et al. | |
| 2006/0184659 A1 | 8/2006 | Motoyama et al. | |
| 2006/0265524 A1 | 11/2006 | Fricke et al. | |
| 2007/0005736 A1 | 1/2007 | Hansen et al. | |
| 2007/0043476 A1 | 2/2007 | Richards et al. | |
| 2007/0055698 A1 | 3/2007 | McCoy et al. | |
| 2007/0055756 A1 | 3/2007 | Richards et al. | |
| 2007/0055757 A1 | 3/2007 | Mairs et al. | |
| 2007/0055758 A1 | 3/2007 | McCoy et al. | |
| 2007/0055759 A1 | 3/2007 | McCoy et al. | |
| 2007/0055760 A1 | 3/2007 | McCoy et al. | |
| 2007/0061046 A1 | 3/2007 | Mairs et al. | |
| 2007/0064633 A1 | 3/2007 | Fricke | |
| 2007/0067062 A1 | 3/2007 | Mairs et al. | |
| 2007/0261062 A1 | 11/2007 | Bansal et al. | |
| 2008/0281472 A1 | 11/2008 | Podgorny et al. | |
| 2009/0083416 A1 | 3/2009 | Nass et al. | |
| 2011/0047259 A1 | 2/2011 | Sato et al. | |
| 2011/0047418 A1 | 2/2011 | Drees et al. | |
| 2011/0131336 A1 | 6/2011 | Wang et al. | |

OTHER PUBLICATIONS

ZigBee Alliance, "New ZigBee Features," 2007, 7 pages.
Daintree Networks, "Understanding 802.15.4 and ZigBee Networking," 2005, 8 pages.
PCT International Search Report, PCT Application No. PCT/US2010/023758, Filing Date Aug. 19, 2010, Applicant Trane International, Inc.
PCT International International Preliminary Report, PCT Application No. PCT/US2010/023758, Filing Date Feb. 10, 2010, Applicant Trane International, Inc.
"BACnet, LonWorks War Continues for BAS Manufacturers", p. 14, Mar. 10, 1997 Issue of Air Conditioning, Heating & Refrigerations News.
"Controls Companies See Opportunities on Internet", Mar. 1, 1997 Issue of Energy User News; 4 pages.
Tracer Summit Web Server, Dated Mar. 2003, Document No. BAS-PRC014-EN.
"Infinity WebServer" brochure, Copyright 1997 by Andover Controls Corporation, Document No. DS-WEBSVR-A.
"Facility Management Unleashed: web.Client", Copyright 2002 by Andover Controls, Document No. BR-WC-A.
"Building Automation Systems on the Internet", by Albert T.P. So, W.L. Chan and W.L. TSE, May/Jun. 1997 Issue of Facilities Magazine, vol. 15, No. 5/6, pp. 125-133.
"Connecting LonWorks and TCP/IP Enterprise Networks-Real Application Successes", by Coactive Aesthetics, dated 1997. 9 pages.

"Remote Building Monitoring and Control", an ACEEE paper, dated Jul. 18, 1996.

Remote Building Control Using the Internet,: by Edward Finch, Dec. 1998 Issue of Facilities Magazine, vol. 15-No. 12/13, pp. 356-360.

"Marketing Tracer Summit", a Marketing Guide dated Jan. 1998, Order No. BAS-MG-46.

"Tracer Summit Users Network", a marketing guide dated Mar. 2002, Order No. BAS-SLM005-EN. 12 pages.

Marketing the Tracer ZN.511 and ZN.521 Zone Controllers, a marketing guide dated Feb. 2001, Order No. BAS-SLM008-EN. 12 pages.

http://www.nettedautomation.com/glossary_menue/glossy_r.html-The Net is the Automation, Netted Automation GmbH, Information and Communication Systems (NAICS), 2000-2002, composed by John Black, Web page. http://www.nettedautomation.com/glossary_menue/glossy_r.html, printed Jan. 20, 2008.

"An Efficient Execution Model for Dynamically Reconfigurable Component Software"; Andreas Gal, Peter H. Frohlich, Michael Franz; Department of Information and Computer Science-University of California, Irvine; May 31, 2002; pp. 1-7; http://research.microsoft.com/~cszypers/events/WCOP2002/10_Gal.pdf.

Microsoft Computer Dictionary, Fifth Edition, "Server" definition, Published: 2002, Publisher: Microsoft Press, p. 474.

PersonalSCADA 2.0 User's Guide, Eutech Cybernetics Pte Ltd., 2002.

"Tracer Summit, Building Automation System," TRANE, Doc # BAS-PRC001-EN, Aug. 2002.

Enterprise Buildings Integrator R310, Specification Data, Honeywell, Mar. 2003. pp. 1-20.

\* cited by examiner

LOG COLLECTION DATA HARVESTER FOR USE IN A BUILDING AUTOMATION SYSTEM

FIELD OF THE INVENTION

The present invention relates generally to the collection of data from multiple sources in a building automation system (BAS). More particularly, the present invention relates to the automated collection of data in situations where the periodic data harvesting that would otherwise cause an over-run condition when the total amount of data to be harvested, multiplied by the time it takes to harvest the data, exceeds the capacity of a system.

BACKGROUND OF THE INVENTION

Building automation systems (BAS) are used to coordinate, manage, and automate control of diverse environmental, physical, and electrical building subsystems, particularly HVAC and climate control but also including security, lighting, power, and the like. Typical existing BAS systems are hardwired or use a proprietary communication standard or protocol to link the various subsystems and provide system-wide user access, monitoring, and control. A BAS may comprise a plurality of end devices, a communication network, a server engine, and a graphical user interface (GUI) or other means of providing control and reporting data to a user. The end devices are each typically associated with a room, a space, a system, or a subsystem for at least a portion of a building or a campus. The server engine may be a wide variety of computer processor based control systems that may comprise a processor, a computer readable storage mechanism, and a user-interface. The communication network may support a plurality of communication protocols and communicatively couples end devices to the server engine.

The introduction of BACnet™, an ASHRAE (American Society of Heating, Refrigerating and Air-Conditioning Engineers) and ANSI (American National Standards Institute) protocol standard some uniformity of network communications has been achieved in the industry. BACnet™ was intended to standardize HVAC interoperability and serve as a solution to industry-wide issues. In use, however, BACnet™ exists in multiple versions and includes various non-standard feature functions. Current BACnet™ standards include ANSI/ASHRAE Standard 135-1995, ANSI/ASHRAE Standard 135.1-2003, ANSI/ASHRAE Standard 135-2004, ANSI/ASHRAE Standard 135.1-2007, and BACnet-2008. Therefore even with the use of a standard network protocol such as BACnet™ the communication capabilities of various end devices may not always be determinable.

Examples of the types of data that these systems collect about the space, building or system they are may include pressures, temperatures, humidity level, power/energy readings, and other run-time statistics. Often it is desirable to periodically gather these measurements in order to establish trends and adapt to changing conditions. The period of time over which this data is gathered may also depend on a variety of factors such as the nature of the data, the preferences of the user, and the quantity or nature of data to be gathered.

In the situation where multiple measurements of these values must be made in a complex system the amount of data gathered may quickly become very large and exceed the capability of the system to collect all of the desired data in a given timeframe. The communication speed of the network connecting the various components of the system will also be a factor in the amount of time required to collect the data. Other unpredictable factors such as equipment failure, power outages, or communication network interruptions may also impact the ability of a BAS to collect the desired data.

For example, the amount of pressure in a steam pipe providing heat to a building may need to be gathered once every minute, the temperatures of the various rooms in that building may only need to be gathered once every five minutes, the power/energy readings for the building may need to be harvested once every fifteen minutes, and the other run-time accumulations of data may be gathered once every hour. If four types of data are to be gathered at the beginning of the hour the amount of data take more than one-minute to collect the system may be unable to commence the collection of the pressure reading at the beginning of the next 1-minute interval. One potential solution to efficiently gather all of the data may be to increase the speed and bandwidth capability of a BAS communication network. However, this is not always a viable option due to the presence of legacy equipment that cannot communicate at higher rates or the costs associated with installing an upgraded network may be prohibitive.

Similarly, it may be cost effective in certain circumstances to upgrade a low cost item such as a sensor, thermostat, or smoke detector with a more advanced model capable of faster communication rates but the same logic does not necessarily apply to larger and more expensive items such as furnaces, chillers, or clean-room equipment. A large volume of low cost end devices may also create a financial hurdle to system wide upgrades when the environmental controls for a large building, office complex, or campus are considered for an upgrade with the goal of improved data collection performance. Therefore, a need exists for a system and method of periodically harvesting data from a plurality of devices, equipment, sensors, or locations, where the periodic data harvesting has characteristics that would cause an over-run condition when the amount of data to be harvested multiplied by the time it takes to harvest the data exceeds the capacity of a system.

SUMMARY OF THE INVENTION

The present invention substantially addresses the aforementioned needs and relates to data harvesting techniques and systems for building automation system (BAS) architectures, and configurations.

In one embodiment, a data harvesting technique is implemented in a system comprising a server engine that is communicatively coupled to a communication network and adapted to establish communications with a plurality of end devices and to automatically implement the periodic data harvesting capabilities in order to efficiently receive and store data about those devices. The end devices of a BAS may be a range of devices including, but not limited to, complex HVAC equipment such as chillers, air-handlers, furnaces, or boilers with multiple data sensors producing a continuous stream of data, to a simple temperature or humidity sensor monitoring an office, a classroom, or external weather conditions.

The data harvesting capability for this variety of devices may be accomplished through the use of the log collection handling techniques described below where the data harvesting work of the communication network is distributed across an extended time. One embodiment may be to distribute the workload across a fixed period of time to achieve the highest throughput and prevent overrun conditions when possible, and avoiding the cumulative falling behind in the case where an undesirable overrun event does occur.

The data harvester uses a scheduler to distribute the workload of a data logger events that are utilized by the data harvester. The scheduler of this embodiment is described by way of example as using 1-minute data collection intervals.

However, this embodiment can be adjusted for data harvesters that require a faster or slower collection rate or timeframe.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The embodiments of the present invention may be more completely understood in consideration of the following detailed description of various embodiments of the invention in connection with the accompanying drawings, in which.

Figure 1:
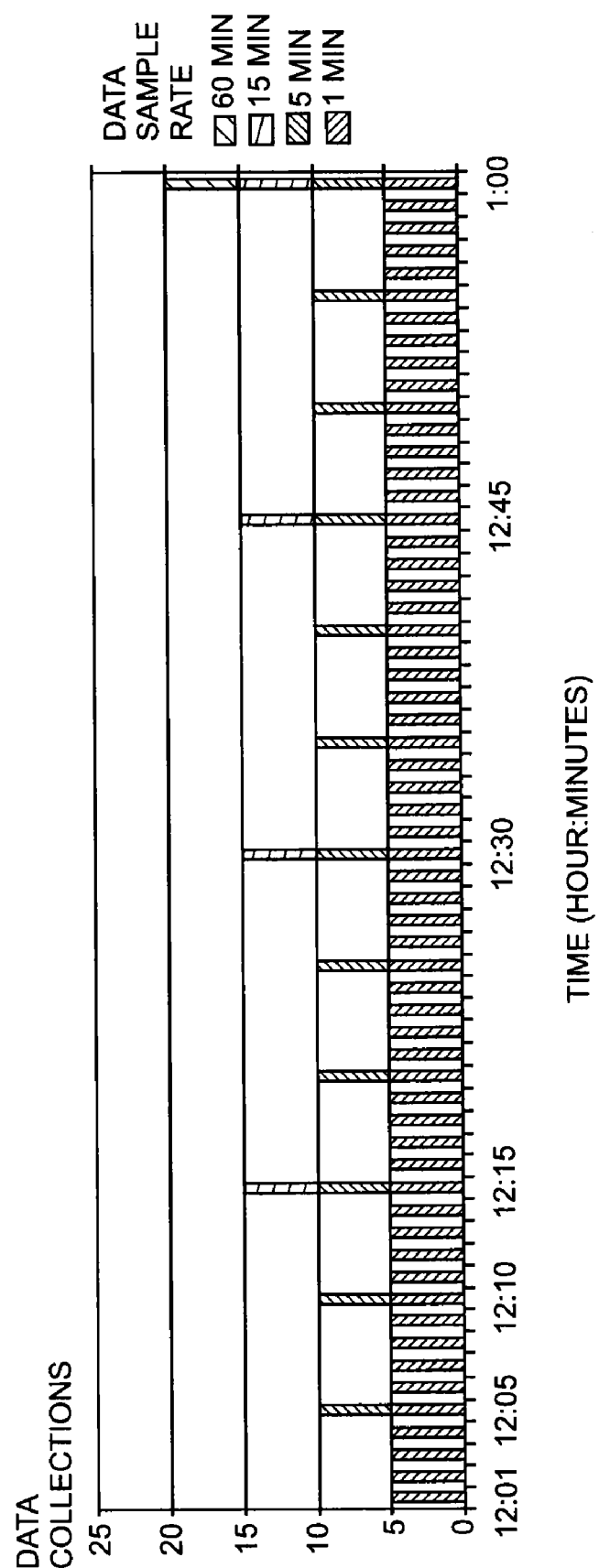
FIG. 1 is an illustration of the harmonic effect of an exemplary set of data gathering requirements.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The invention can be more readily understood by reference to FIGS. 1-6 and the following description. While the invention is not necessarily limited to the specifically depicted application(s), the invention will be better appreciated using a discussion of exemplary embodiments in specific contexts.

The systems and methods of one embodiment of the invention can effectively prioritize and manage data and information within a locally or widely distributed building automation system (BAS), from a space or building level to an enterprise level, encompassing virtually any structure, cluster, campus, and area in between. The systems and methods are particularly suited for configurable BAS and architecture, such as the TRACER ES system produced by TRANE, INC., the assignee of the present application. A description of one embodiment of the TRACER ES system is described in U.S. patent application Ser. No. 11/316,695, filed Dec. 12, 2005, which is hereby incorporated by reference in its entirety. Another description of an embodiment of the TRACER ES system is described in U.S. patent application Ser. No. 11/36,697, filed Dec. 22, 2005, which is hereby incorporated by reference in its entirety.

This example is simplified and single-threaded to illustrate the problems that may be solved by an embodiment of the invention. As a BAS capacity scales and multi-threaded implementations are introduced to improve throughput, the concepts illustrated by the simple example are still applicable. Consider the follow scenario of data to be collected as an example:

- 5 pressure sensor readings to be harvested once per minute.
- 5 temperature sensor readings to be harvested once every 5 minutes.
- 5 power consumption readings to be harvested once every 15 minutes.
- 5 run-time data readings to be harvested once every 60 minutes.

In a BAS with a capacity for processing ten data logs at a time, and ten seconds to harvest the data for each reading, FIG. 1 illustrates the profile of collecting this data over a one-hour period.

As shown in FIG. 1 the system capacity of ten data collections is exceeded at the 12:15, 12:30, 12:45, and 1:00 minute marks on the horizontal time axis. At these times there are more data readings scheduled than the system can process in the allocated time. These are referred to as overruns in amplitude or "type-1 overruns."

In addition to the capacity or amplitude overload, the amount of time to harvest the data must also be considered. If harvesting a single point of data takes ten seconds, then six data points can be harvested in a one minute window. With this example, the five temperature data collection at each 5-minute mark will cause the system to fall behind in harvesting by 40 seconds (10 data points*10 seconds per data point=100 seconds of processing time to accomplish the data harvest in only 60 seconds). These are referred to as overruns of period or "type-2 overruns."

Figure 2:
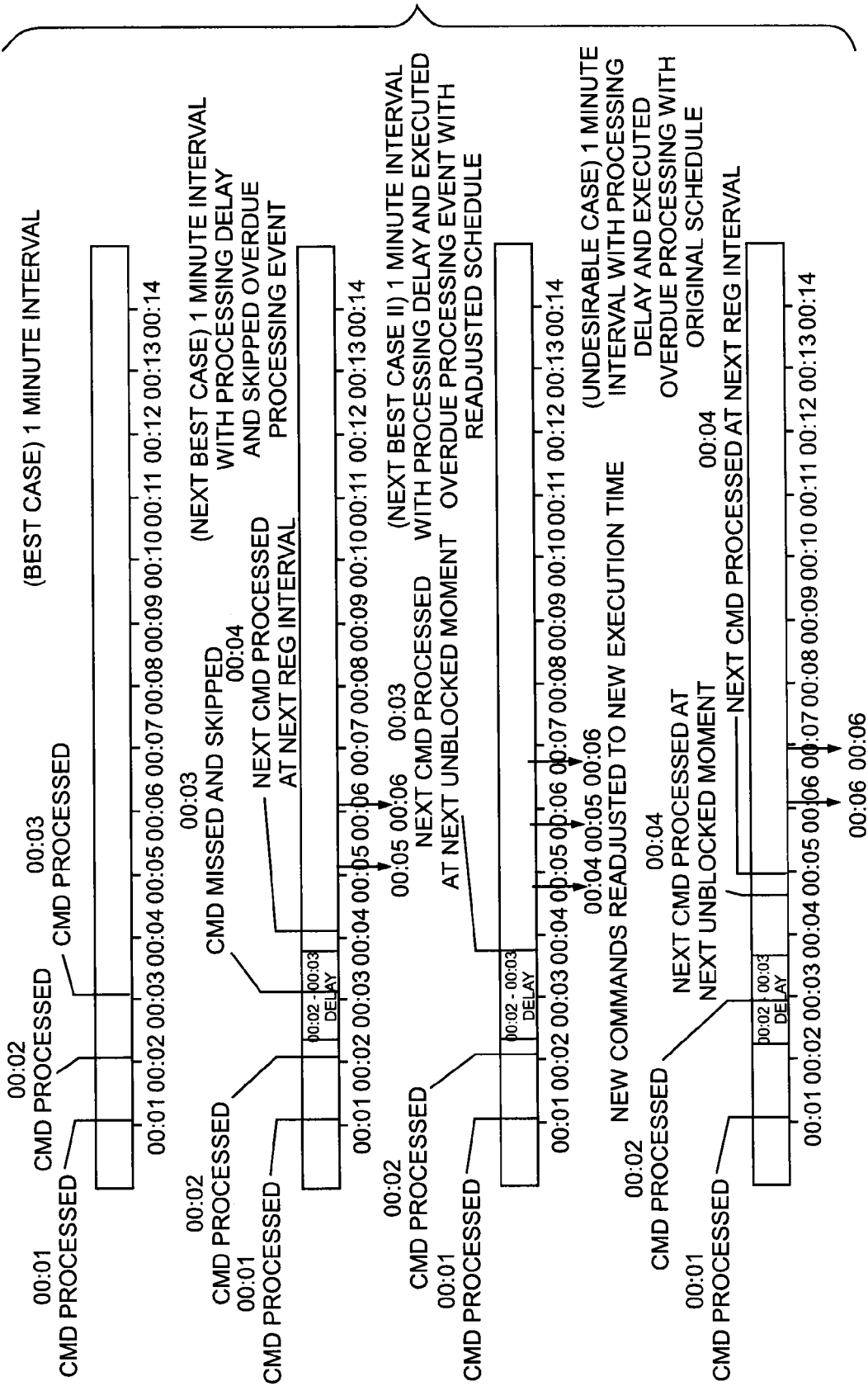
FIG. 2 is a depiction of a variety of timelines for data harvesting scenarios.

The overruns of amplitude and period both exceed the capacity of the system in this example. One by the amount of work that the system can handle by specification, and one exceeding the amount of work that can be completed in a 1-minute time period. There are additionally two more types of overruns that can occur due to the unpredictable and dynamic variations during run-time. FIG. 2 illustrates the potential effect of delays and latency on the queues that may cause overruns.

As shown in FIG. 2, the best case scenario for data collection is for each schedule data harvest occur periodically with the same amplitude. In this situation each command to process the data harvested is started once every minute, and has sufficient time to complete the collection and storage of the gathered data. There are no conflicts between the data harvests and no overruns as discussed above.

Non-ideal scenarios are illustrated in FIG. 2 as Next Best Case I & II, where the data harvest command scheduled for time period 0:02 overran its schedule period and "bled into" the next time period (0:03). In FIG. 2, the system recovered from this period overrun by skipping the scheduled command at time period 0:03 and resumed the processing of data before the next regular interval (0:04). This cumulative workload situation is analogous to a "type 3 overrun."

Another problem scenario is illustrated in Next Best Case II of FIG. 2, where instead of skipping a command that is unable to commence processing at its scheduled interval the system begins processing at the first unblocked moment. In this case, the data harvest command scheduled for time period 0:03 is started as soon as the command processing originating at time 0:02 is complete. All subsequent data collection commands are then readjusted, or pushed off, to a later time while maintaining the scheduled frequency of data collection.

FIG. 2 also illustrates an undesirable situation where if the item being processed is past a given percentage of its precision, it may be considered too stale to harvest, and it would dropped from the data harvest schedule. This is an example of an overrun condition that occurs due to dynamic conditions that occur during run-time that aren't necessarily predictable.

FIGS. 3-6 capture the process flow and logic of one potential embodiment for harvesting and controlling the data log harvester to counteract these non-ideal situations. It is the subject of this example embodiment to handle the log collection overruns that may occur during the data harvesting work. The embodiment disclosed here distributes the workload across the hour, or other appropriate time period, to achieve the desired throughput and prevent overrun conditions when possible, and avoiding the cumulative "falling behind" in data gathering on the chance that an overrun does occur. To accomplish these goals, the embodied system utilizes a scheduler 100 to distribute the workload of the data log harvester across a calendar forming a plurality of queues. The scheduler 100 may comprise a two-dimensional array (or queue) of all the work to be accomplished in a 1-minute window arranged and grouped by minute.

Figure 3:
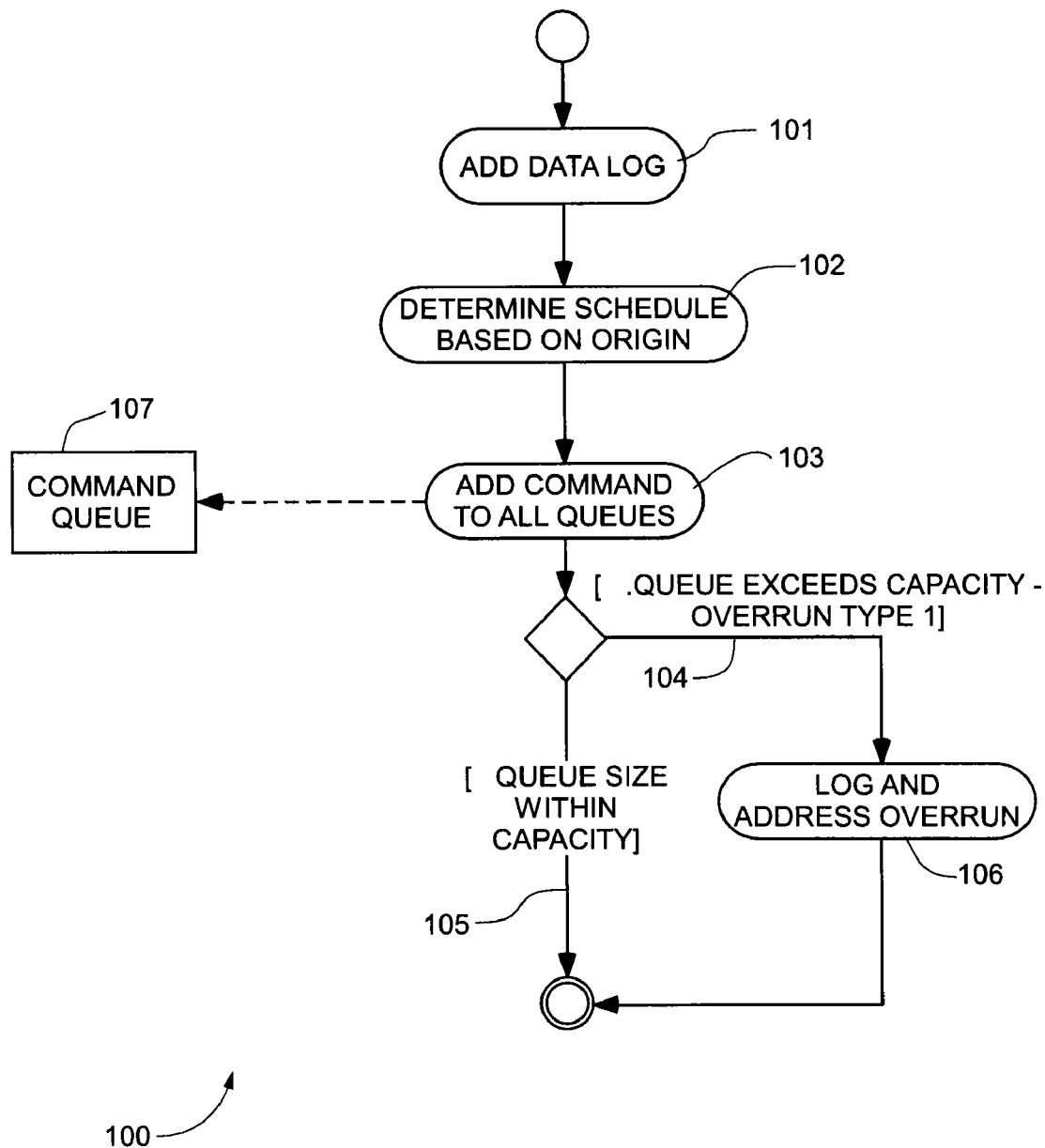
FIG. 3 is a flow diagram of one potential embodiment of a scheduler.

FIG. 3 illustrates a potential queuing scheduler 100. Initially, a user, or the system automatically, may enter an add data log command 101. The system then determines the appropriate schedule 102 based on the origin or contents of the data log command 101. The system then adds the data log command 101 to the appropriate command queue 107. In the case where the command queue 107 for a give time slot is has exceeded its capacity 104 then the system logs the condition 106. In another embodiment, not depicted here, the scheduler may modify the data harvest schedule by placing the data log command 101 in an adjacent time slot, thereby shifting the schedule. In the case where the command queue 107 has adequate capacity 105 then the data log command 101 is placed in the command queue 107 and the queuing scheduler 100 may remain idle until the next command is entered.

The capacity 104 of a queue is a variable parameter that will depend on the resources of the implemented system. Factors such as the speed of the network, the responsiveness of various end devices, and the processing capacity of the server engine powering the system. The user of the system may also be allowed to adjust the queue capacity based on the desired performance characteristics that the user may desire.

Figure 4:
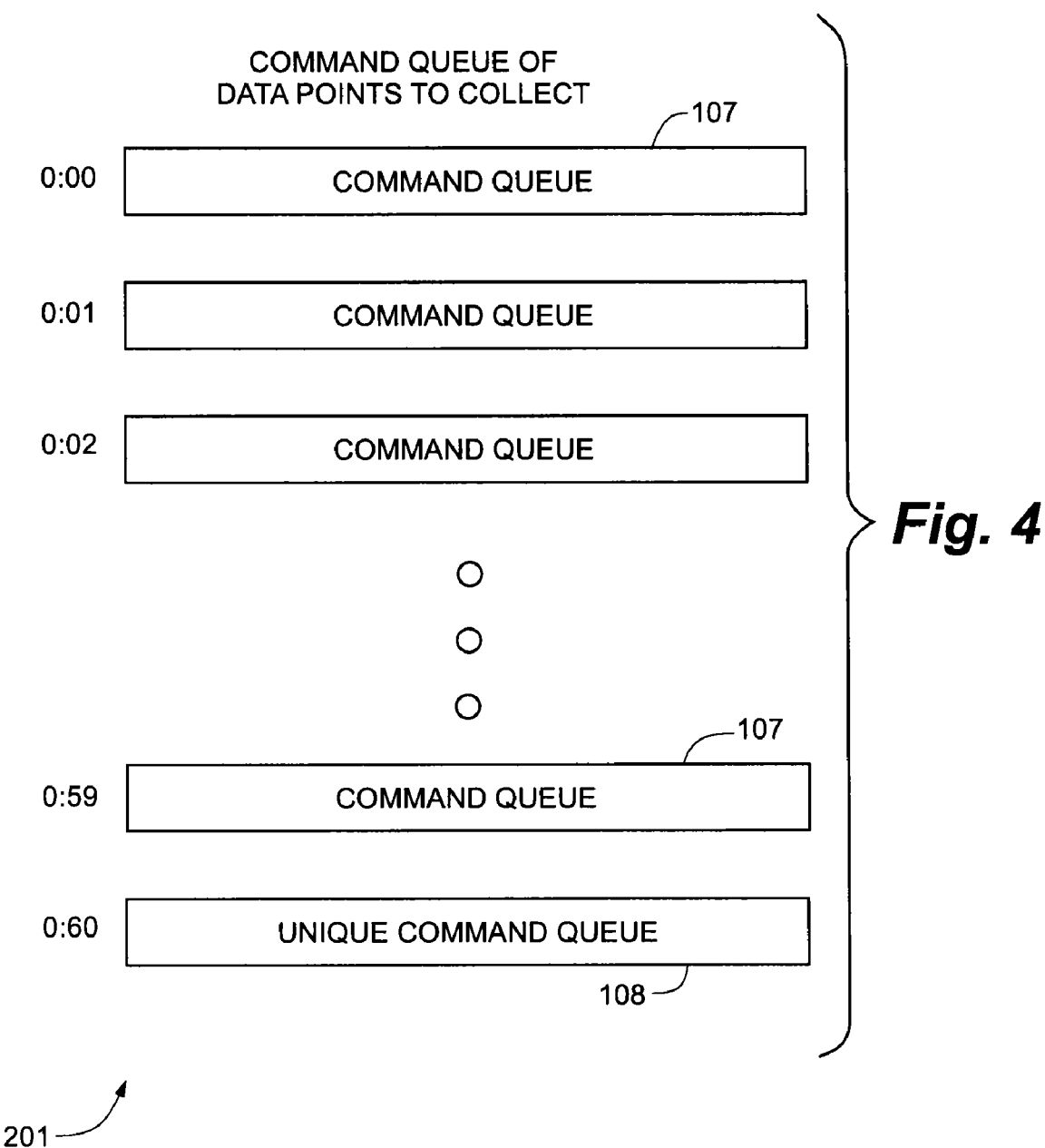
FIG. 4 is a depiction of a calendar or command queue array in one potential embodiment of this invention.

FIG. 4 illustrates a potential embodiment of a calendar or command queue array 201 comprised of a plurality of time entries for data harvesting, each with an individual command queue 107. In this example embodiment each time entry represents a single minute slot where the command queue 107 contains all of the data log commands 101, indicating the desired data points to be harvested, that were queued by the queuing scheduler 100. The commend queues 107 corresponding to time-slots 0:00 through 0:59 correspond to those data log commands 107 that can be serviced on regular intervals over the course of an hour. For example, if data is to be collected once every 15-minutes beginning at the top of each hour, then four data log commands 101 would be placed into the command queue 107 time-slots corresponding to labels 0:00, 0:15, 0:30, and 0:45.

A data collection schedule that does not correspond to a periodic rate that can be distributed across the command queue array 201 may be placed in an irregular or unique command queue 108. For example, if a specific set of data is to be gathered periodically once every 47 minutes the use of the irregular command queue 108 would be utilized. This unique command queue 108 would therefore be checked at each time-slot interval, here once a minute, in order to determine if any irregularly scheduled data collection is required during that time-slot.

Figure 5:
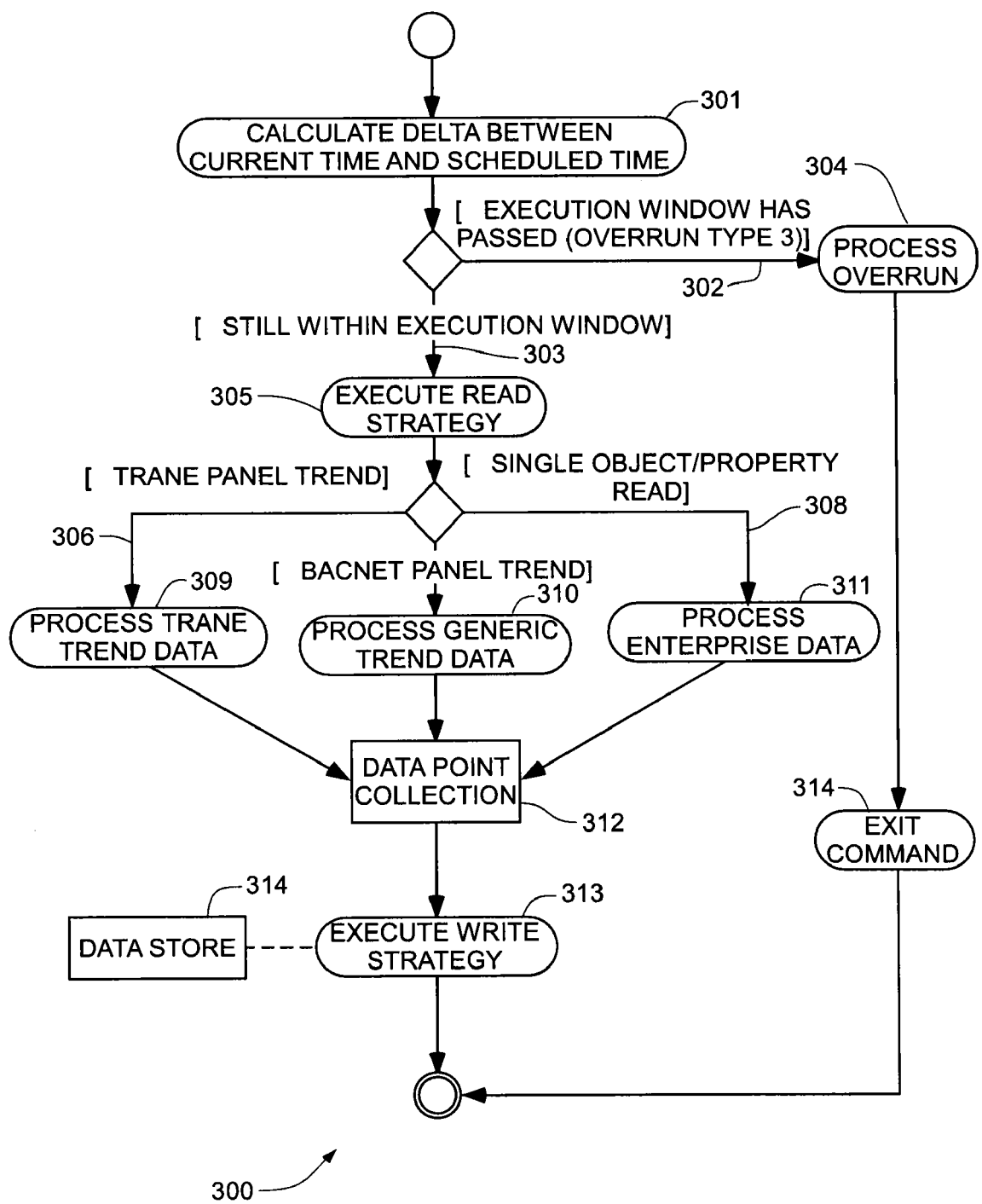
FIG. 5 is a flow diagram of one potential embodiment of a data harvester.

FIG. 5 illustrates a potential embodiment of a data harvester 300. At each scheduled data harvest period, in this example runs once every minute, the data harvester 300 calculates the delta 301, or difference, between the current time and the scheduled data harvest time. If the execution window for the collection has passed 302, such as when the system has experienced a type-3 overrun, and then the process overrun 304 is processed. Finally, the data harvester 300 issues the exit command 314 when it determines that its scheduled tasks are complete or the execution window has closed.

In the case where the data harvester 300 is still operating within the execution window 303 then the system read strategy 305 is executed. As depicted in FIG. 5, multiple devices of various types may be subject to a data harvest at any given time interval. In this example three different device types are depicted in order to illustrate the flexibility of the system. Separate processes or threads may be utilized for collecting data points from a proprietary system such as TRANE trend data 306, generic BACnet data 310, or enterprise data 311 for a variety of other systems. All of the individual data points 312 are collected and then written into a data-store 314. At the completion of the write strategy 313 to the data-store 314 the data harvester 300 has completed the operations scheduled for that time period and may wait until the next appropriately scheduled time for data collection.

While the example embodiment depicted here is a single threaded example, those skilled in the art of developing systems to communicate with a plurality of physical devices will recognize that a multi-threaded approach may also be utilized. One potential embodiment of such a multi-threaded system for data harvesting may also employ a thread-monitor or scheduler that would measure the data harvesting progress in real time and increase or decrease the number of threads utilized by the system in order to achieve the most efficient utilization of network communication and processor capacity.

The read strategy 305 may be implemented to account for various delays in gathering the requested data from various end-point devices. Examples of such delay may be due to a device being off-line, routing errors in the communication network, other processing burdens on the server engine that interrupted the data collection, or any other delay typically associated with network based communications.

Figure 6:
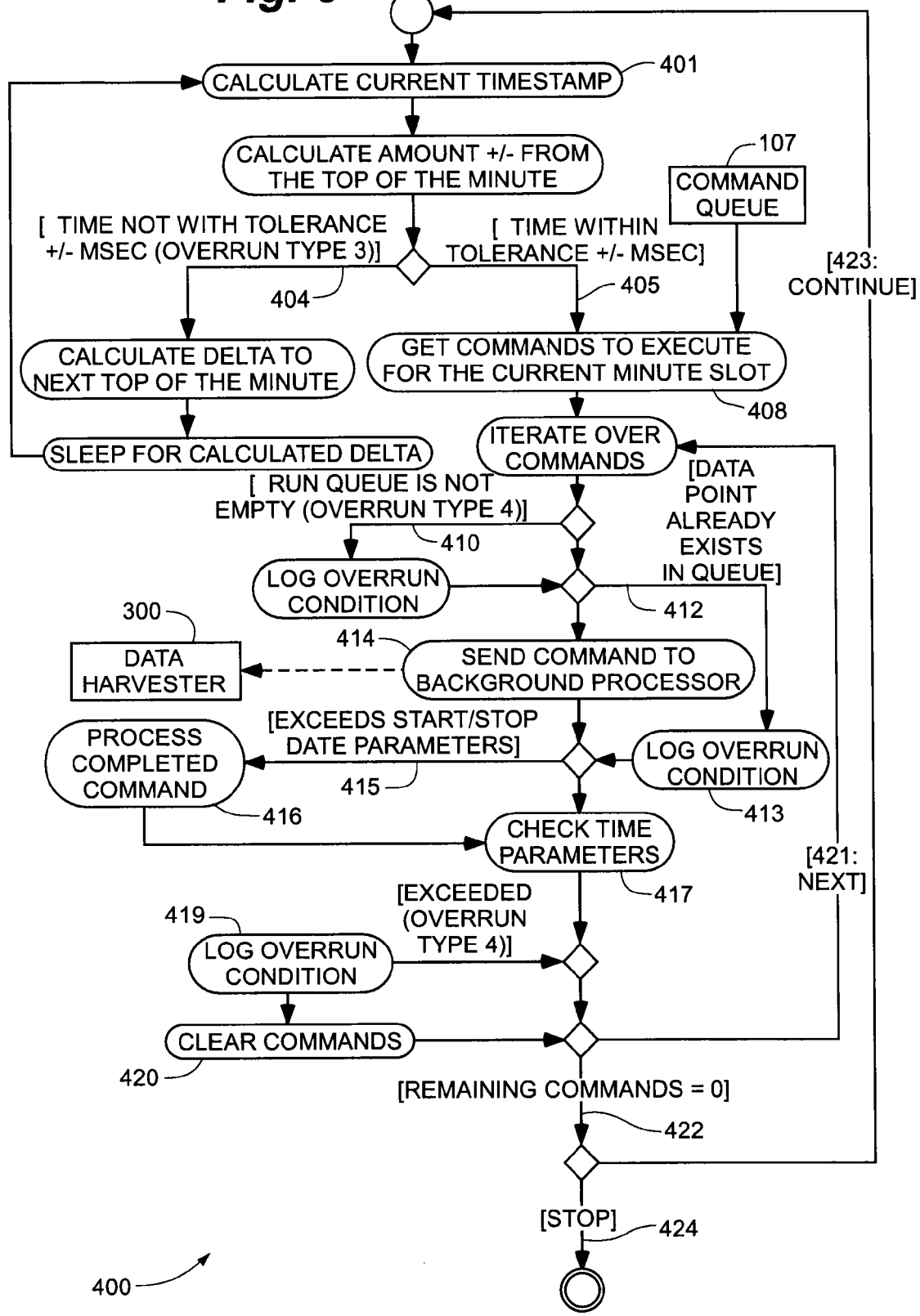
FIG. 6 is a flow diagram of one potential embodiment of a log collection handler.

FIG. 6 illustrates a potential embodiment of a log collection handler 400. The log collection handler 400 is configured to regulate the work of the data harvester 300 as well as to monitor performance of the data collection activities. In order to minimize the collection of stale or irrelevant statistics the log collection handler 400 may also prioritize which data log commands 101 in a command queue 107 should be allocated a higher priority in order to assure the greatest probability that the most important data is gathered.

For example, a one-minute trend that is off by twenty seconds may be considered to be a worse situation than a one-hour trend off by five minutes. To allow this tolerance the priority of data log commands 101 should be modifiable by the user to allow for more precise tuning or to accommodate the specific needs of the system. This example gives a priority to higher-frequency trends without totally sacrificing the sampling of data points with longer samples. While other priority mechanisms may be accomplished by adjusting the precision percentage, or by using fixed time limits, separate queues, or more queue labels that would prioritize the most important data sample frequencies. Again, these time limits may be adjusted by the user of the system or set to a fixed priority scheme by a manufacturer in order to achieve a specific performance metric with known equipment.

On the top of the minute (when the second hand is at 12:00), the queuing processor will attempt to move all of the items in that minute's array into a run queue to be processed. The run queue refers to the time slot currently being serviced by the data harvester 300. Referring again to FIG. 6, the log collection handler 400 first calculates the current timestamp 401 and the amount of time remaining 402 in the current time period. If there is a type-3 overrun 404 due to the amount of time remaining 402 being less than the precision percentage allowed (in this example 25%) then no data harvest is performed and system going into a sleep state 407 for the duration of time 406 until the beginning of the next harvest time period. This scenario is the result of the assumption that is better to skip the current time period data sample if there is insufficient time to complete the data gathering tasks. This precision boundary will allow more time tolerance for data samples of longer frequencies. The 25% value is tunable by setting external parameters in order to achieve the desired performance characteristics. Because there is only a small window of time remaining in the current time period by waiting until the next time period to begin data gather the risk of further overruns is reduced.

If the amount of time remaining 402 in the current timestamp 401 is within the allowed precision percentage then the system proceeds along branch 405 and retrieves the data log commands 101 from the appropriate command queue 107 for the current timestamp 401. If the run queue is not empty, then an overrun has occurred (either a type 2 or type 3 overrun depending on the circumstances of the data points and environment). The items being moved in the queue that have existing requests for data points in the queue are duplicates and are not queued. These data point requests are simply skipped & flagged as overrun 413 by the system.

Assuming that the run queue is empty, the dequeuing mechanism pulls out the first data log command 101, indicating a data-item to sample, from the command queue 107 in a priority order—in this example the shortest frequency first. The background processor 414 then invokes the data harvester 300 of FIG. 5 with the data log command 101 to be processed. At the completion of the data harvesting process for the data log command 101 the log collection handler 400 checks the time parameter 417. If there is still time available in the current timestamp 401 then the log collection handler 400 iterates to the next command 421.

If the data harvester 300 was unable to complete the data collection of all of the entries during the allotted time-slot then an overrun condition 419 occurs and is logged. In the case of an overrun condition any new command that is already in the queue is discarded 420. This is another example of the type-4 overrun condition that may occur due to dynamic conditions that occur during run-time that aren't predictable. When all data log commands 101 are successfully processed within the current timestamp 401 then the log collection handler stops 424 until the beginning of the next time slot.

Another alternative embodiment may include the throttling or shaping the amount of data to be retrieved from a particular BAS end device in a given time slot. While this approach may depend on the capabilities of a given piece of equipment, in those cases where an intelligent end device is able to understand or comply with a request for a limited subset of all of the sensor data available to it additional data collection management may be employed. For example, if a BAS network is experiencing an unusually high volume of traffic the system control mechanism may direct some data collection tasks to only gather high priority data, or a reduced data payload from a devices of a certain type or specific location in the system. This embodiment may also have the capability to direct a unique individual device to provide only a certain type or amount of data. Again, these capabilities are flexible enough to accommodate a wide variety of sensors, controls, and equipment, regardless of their communication speeds or programmability.

The foregoing descriptions present numerous specific details that provide a thorough understanding of various embodiments of the invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only and not restrictive. Other embodiments may be constructed that nevertheless employ the principles and spirit of the present invention.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A method of gathering data from a plurality of end devices, connected through a network means to a server engine adapted to accept, store, and retrieve data by means of a processor-based control system in a building automation system (BAS) comprising:
   entering a plurality of data log commands into a command queue array, wherein the command queue array comprises a plurality of command queues associated with a period of time, and each command queue is configured to have a capacity corresponding to the number of data log commands that can be processed within the period of time;
   iterating through the plurality of the command queues in the command queue array;
   processing the data log commands during the period of time associated with each command queue;
   harvesting at least one value from at least one of the end devices as directed by the data log commands;
   monitoring the processing of the command queues such that if the processing of a given command queue extends into the period of time associated with a subsequent command queue by a predetermined percentage, then the data log commands of the subsequent command queue are not executed.

2. The method of claim 1 further comprising:

accommodating the end devices that have a predetermined network reporting capability that is less than a maximum capacity of the network by prioritizing the harvesting of the value from the end device with a higher frequency of the data log commands above the end device associated with a lower frequency of the data log commands.

3. The method of claim 1 further comprising:

verifying by the data harvesting module that the single data log command to be extracted from a command queue is not already present in the command queue before placing the data log command in the command queue.

4. The method of claim 1 further comprising:

verifying by the data harvesting module that the predetermined percentage of time associated with a command queue has not elapsed before iterating to a next data log command in the given command queue.

5. The method of claim 1 wherein:

at least a portion of the plurality end devices is compatible with at least one network standard selected from the set consisting of:

ANSI/ASHRAE Standard 135-1995, ANSI/ASHRAE Standard 135.1-2003, ANSI/ASHRAE Standard 135-2004, ANSI/ASHRAE Standard 135-2007, and BACnet-2008.

6. The BAS of claim 1, wherein at least a portion of the network means is compatible with at least one BACnet standard.

* * * * *